US011713377B2

(12) United States Patent
Roseen

(10) Patent No.: US 11,713,377 B2
(45) Date of Patent: Aug. 1, 2023

(54) POLYOLEFIN PIPE

(71) Applicant: Uponor Innovation AB, Virsbo (SE)

(72) Inventor: Patrik Roseen, Västerås (SE)

(73) Assignee: Uponor Innovation AB, Virsbo (SE)

( * ) Notice: Subject to any disclaimer, the term of this patent is extended or adjusted under 35 U.S.C. 154(b) by 0 days.

(21) Appl. No.: 15/558,400

(22) PCT Filed: Apr. 20, 2016

(86) PCT No.: PCT/EP2016/058812
§ 371 (c)(1),
(2) Date: Sep. 14, 2017

(87) PCT Pub. No.: WO2016/170016
PCT Pub. Date: Oct. 27, 2016

(65) Prior Publication Data
US 2018/0057644 A1    Mar. 1, 2018

(30) Foreign Application Priority Data

Apr. 22, 2015  (GB) .................................... 1506876

(51) Int. Cl.
| | | |
|---|---|---|
| *C08J 3/24* | (2006.01) |
| *B29C 48/00* | (2019.01) |
| *C08K 5/134* | (2006.01) |
| *C08K 5/3415* | (2006.01) |
| *F16L 9/12* | (2006.01) |
| *C08K 5/14* | (2006.01) |
| *C08K 5/00* | (2006.01) |
| *C08K 5/3432* | (2006.01) |
| *C08K 5/13* | (2006.01) |
| *B29C 35/02* | (2006.01) |
| *C08K 5/3435* | (2006.01) |
| *C08K 5/375* | (2006.01) |
| *C08K 5/10* | (2006.01) |
| *C08K 5/3492* | (2006.01) |
| *B29L 23/00* | (2006.01) |

(52) U.S. Cl.
CPC ................. *C08J 3/24* (2013.01); *B29C 35/02* (2013.01); *B29C 48/022* (2019.02); *C08K 5/005* (2013.01); *C08K 5/13* (2013.01); *C08K 5/134* (2013.01); *C08K 5/14* (2013.01); *C08K 5/3415* (2013.01); *C08K 5/3432* (2013.01); *C08K 5/3435* (2013.01); *C08K 5/375* (2013.01); *F16L 9/12* (2013.01); *B29L 2023/22* (2013.01); *C08J 2323/06* (2013.01); *C08K 5/10* (2013.01); *C08K 5/34924* (2013.01); *C08L 2203/18* (2013.01); *C08L 2207/062* (2013.01); *Y10T 428/1352* (2015.01)

(58) Field of Classification Search
CPC ....... C08J 3/24; C08J 2323/06; B29C 48/022; B29C 35/02; F16L 9/12; B29L 2023/22; C08K 5/3435; C08K 5/3415; C08K 5/13; C08K 5/3432; C08K 5/134; C08K 5/14; C08K 5/005; C08K 5/10; C08K 5/375; C08K 5/34924; C08L 2203/18; C08L 2207/062

See application file for complete search history.

(56) References Cited

U.S. PATENT DOCUMENTS

| | | | |
|---|---|---|---|
| 2,958,672 A | 11/1960 | Goldberg | |
| 5,021,500 A * | 6/1991 | Puydak ................. | C08L 23/283 524/525 |
| 5,362,808 A | 11/1994 | Brosius et al. | |
| 5,461,119 A | 10/1995 | Marczinke et al. | |
| 2005/0124766 A1 | 6/2005 | Kimura et al. | |
| 2005/0192177 A1 * | 9/2005 | Roger .................. | C08F 210/16 502/204 |

FOREIGN PATENT DOCUMENTS

| | | |
|---|---|---|
| CA | 2908284 A1 | 2/2008 |
| CN | 1229814 A | 9/1999 |
| CN | 101696305 A | 4/2010 |
| CN | 103044745 A | 4/2013 |
| CN | 103467812 A | 12/2013 |
| EP | 0407098 B1 | 2/1994 |
| EP | 2810984 A1 | 12/2014 |
| JP | S60188412 A | 9/1985 |
| JP | 01178538 A | 7/1989 |
| JP | H0395242 A | 4/1991 |
| JP | H0649114 A | 2/1994 |
| JP | H0665445 A | 3/1994 |

(Continued)

OTHER PUBLICATIONS

Hilborn et al., "Photocrosslinking of EPDM Elastomers, A New Method for Rapid Curing of Elastomer Coatings at Room Temperature*", Rubber Chemistry and Technology, Sep. 1988, vol. 61, No. 4, pp. 568-576.
UK Intellectual Property Office Search Report for corresponding UK Application No. GB1506876.0, dated Oct. 20, 2015.
International Search Report and Written Opinion of the International Searching Authority in International Application No. PCT/EP2016/058812 dated Aug. 1, 2016.
Liu, Shaoping et al., "Composite PE Water Supply Pipe", Database CA [Online] Chemical Abstracts Service, Columbus, Ohio, US; Database Accession No. 2013: 1990864; Dec. 27, 2013.
Liu, Junqing, "Method for preparing anticorrosive, antiwaxing and heat-resistance polyethylene pipe material for petroleum recovery", Database CA [Online] Chemical Abstracts Service, Columbus, Ohio, US; Database Accession No. 2013: 606478; Apr. 19, 2013.

(Continued)

*Primary Examiner* — James C Yager
(74) *Attorney, Agent, or Firm* — Greenberg Traurig, LLP; Chinh H. Pham; Natalie Salem

(57) ABSTRACT

This invention relates to a polymeric pipe, and more particularly a polymeric pipe where the pipe comprises a cross-linked polyolefin formed from extruded polyolefin comprising a bismaleimido crosslinker. This invention relates to the manufacturing of plastic pipes and tubing of polyolefinic polymers such as polyethylene, with crosslinking by a bismaleimido crosslinker, to produce crosslinked polyethylene (PEX) pipes and tubing.

17 Claims, No Drawings

(56) References Cited

FOREIGN PATENT DOCUMENTS

| | | |
|---|---|---|
| JP | H11263884 A | 9/1999 |
| JP | 2002295741 A | 10/2002 |
| JP | 2003514088 A | 4/2003 |
| JP | 2012504513 A | 2/2012 |
| WO | 2001034680 A1 | 5/2001 |
| WO | 2010040079 A1 | 4/2010 |
| WO | 2014177435 A1 | 11/2014 |

OTHER PUBLICATIONS

Yamamoto, Hisao et al., "Rubber compositions for tire treads", Database CA [Online] Chemical Abstracts Service, Columbus, Ohio, US; Database Accession No. 2013: 1990: 100501; Mar. 18, 1990.

Skipper et al., "Monocyclic aromatic amines as potential human carcinogens: old is new again", Carcinogenesis, vol. 31 No. 1, pp. 50-58, (2010).

Stoyanov et al., "Modification of polyethylene with bismaleimides", International Polymer Science and Technology, vol. 26, No. 12, (1999).

https://pubchem.ncbi.nlm.nih.gov/compound/83648, NIH National Library of Medicine.

Stoyanov, O.V., et al., "Modification of polyethylene with bismaleimides", No. 5, pp. 32-39, (1999).

\* cited by examiner

POLYOLEFIN PIPE

CROSS-REFERENCE TO RELATED APPLICATIONS

This application is a U.S. national phase application under 35 U.S.C. 371 of PCT International Application No. PCT/EP2016/058812, filed on Apr. 20, 2016, which claims priority to and the benefit of GB 1506876.0, filed on Apr. 22, 2015, the disclosures of each of which are hereby incorporated herein by reference in their entireties.

FIELD OF THE INVENTION

This invention relates to a polymeric pipe, and more particularly a polymeric pipe where the pipe comprises a crosslinked polyolefin formed from extruded polyolefin comprising a bismaleimido crosslinker. This invention relates to the manufacturing of plastic pipes and tubing of polyolefinic polymers such as polyethylene, with crosslinking by a bismaleimido crosslinker, to produce crosslinked polyethylene (PEX) pipes and tubing. The pipes are intended to be used in cold (e.g. potable) or hot water applications.

BACKGROUND

Extruded pipes made from polyolefin polymers are well known for a variety of industrial applications. Typically they are used in the building industry for domestic (e.g. potable) water pipes, radiator pipes, floor-heating pipes and for similar applications such as ship building. Such polyolefin pipes can also be used as district heating pipes and as process pipes in the food industry etc. Other applications include the conveyance of gaseous fluids and slurries.

The polyolefin used in extruded pipes is often crosslinked, as this provides a number of advantages. Such advantages include, but are not limited to, long term stability including oxidation resistance, which assists in meeting current codes and standards for potable water applications, flexibility in installation including a "memory effect", etc. Crosslinked polyethylene (PEX) is commonly used for plastic pipes. There are several varieties of PEX that utilize a number of different crosslinking chemistries and processing technologies. Various PEX grades further contain other additives such as antioxidants and/or stabiliser packages and/or processing aids in different concentrations and combinations. Three known varieties of PEX for pipe applications are PEX-a, PEX-b, and PEX-c.

In the PEX-a process (e.g. produced by the "Engel Method", salt bath method "Pont a Mousson", or infrared (IR) method), the cross-linking is induced by peroxide. In the Engel Method the cross-linking is induced by peroxide under the influence of heat and high pressure. In the IR method the cross-linking is induced by peroxide under the influence of IR applied heat. The resultant PEX-a composition is crosslinked through carbon-carbon bonds to form the cross-linked polymer network. The PEX-a crosslinking process occurs in the melted stage, as opposed to the primary crosslinking processes for PEX-b and PEX-c, where the crosslinking occurs in a solid state of the polymer. The primary reaction is the formation of free radicals upon decomposition of the peroxide, which has to be present by definition for PEX-a, and subsequently, the free radical abstracts hydrogens from the PE polymer chains. The latter gives new carbon radicals, which next combines with neighboring PE chains to form stable carbon-carbon bonds, i.e., crosslinks. The crosslinking, which is considered to be homogeneous and uniform for PEX-a, gives degrees of crosslinking (typically referred to as CCL) in the range of 70-90% for practical applications. In some applications the CCL should be above 70% for PEX-a as defined in ASTM International Standard for Crosslinked Polyethylene (PEX) Tubing, F 876-10 (approved Feb. 1, 2010), and/or in some applications the CCL should be above 70% for PEX-a as defined in ISO 15875. The PEX-a process may therefore be used to produce good quality pipes In the PEX-b process, the crosslinking is induced by moisture and heat over extended pre-determined times typically conducted in a "Sauna atmosphere". The most commonly used methods are referred to as the Sioplas (two-steps), and the Monosil (one step) methods, respectively. In the Sioplas method, a silane, such as for example a vinylsilane is grafted to a HDPE resin prior to pipe extrusion. In the Monosil method, a silane is blended with the HDPE resin during pipe extrusion. In both methods, which are chemically different in the pre-crosslinking steps, the fundamental principle for the actual crosslinking are practically identical, i.e., the crosslinking occurs in a secondary post-extrusion process that is accelerated by a combination of heat and moisture. The latter combination is the active "reagent", which is involved in the primary hydrolysis and condensation reaction. In principle, the extruded pipe is exposed to hot water and a steam bath. A fundamental difference to PEX-a, is that for PEX-b, the resultant crosslinks are not between carbon-carbon bonds, but instead, oxygen-silicon covalent bonds (siloxane "bridges") are formed. In comparison with PEX-a, the crosslink density (CCL) is somewhat lower for PEX-b (65-70%), and the crosslinking is also less uniform. PEX-b typically has a minimum CCL requirement of ≥65%.

In the PEX-c process, the crosslinking is commonly referred to as a "cold" method. In the PEX-c process, no chemicals are needed in order to facilitate the crosslinking process, but instead high energy electron beam (EB) irradiation is utilized to create the free radicals necessary for the hydrogen abstraction and subsequent crosslinking to take place. The high energy electron beams are non-selective, i.e., chemical bonds are cleaved in an un-controlled fashion. The latter has the consequence of creating side reactions, together with the reaction aimed for, i.e., the crosslinking of HDPE. The crosslinking density for PEX-c is typically in the 70-75% range (minimum requirement ≥60%), and caution has to be taken with irradiation time since a too long exposure may give discolored products and/or brittleness. PEX-c has been successfully used for many years despite the somewhat challenging production conditions.

One challenge that occurs with all extruded pipes used for drinking water applications is a potential issue with leaching of additives from the polymer pipe matrix. Additives, including initiators, stabilisers, co-agents, processing aids, antioxidants, degradation product thereof etc. may leach from the polymer matrix over time and can become available to contaminate the fluid contents flowing within the pipe. This problem is a particular issue in cases such as drinking water applications and industry standards exist which quantify the allowable levels of leaching of materials from the pipe over a period of time for such applications. In addition leaching of additives, additive degradation products, and/or crosslinking by-products may result in pipes that do not pass total organic carbon (TOC), or taste and odour tests. The various additives may be required to be present in the pipe when manufacturing it in order to facilitate processing of the pipe when extruding the raw material polymer and also to ensure structural integrity and resistance to ageing etc. of the finished pipe. Similarly, crosslinking agents are typically required to obtain a pipe with the desired level of crosslinking. At the same time, the very presence of additives, degradation products and cross-linking by-products presents a challenge, since these materials may leach from the polymer matrix over a period of time.

It is apparent that known extruded pipes and methods of making such pipes are subject to a number of limitations. There is therefore a need for new methods of production and/or new combinations of chemical components to improve the methods of production and/or properties of polyolefin pipes.

It is an aim of the present invention to provide materials for forming pipes that can be used in cold and/or hot water application, for example in domestic cold and/or hot water application. It is also an aim to provide materials for producing pipes for industrial application. It is an aim to produce pipes which are resistant to the leaching out over time of one or more of the components. A further aim is to produce pipes for domestic applications which meet or exceed current standards for one or more of TOC, taste, and odour. The present invention satisfies some or all of these aims.

BRIEF SUMMARY OF THE DISCLOSURE

The present invention provides a pipe which benefits from a reduced level of leaching of chemical residues, while minimizing or avoiding an additional post-extrusion treatment to reduce said leaching. The pipes of the invention provide a number of advantages. For example the pipes may meet or exceed current standards for one or more of TOC, taste, and odour, without requiring additional post-extrusion processing steps, e.g. an additional time consuming heat treatment.

One aspect of the invention provides a polymeric pipe formed from:

a polyolefin structural polymer; and a bismaleimido crosslinker in an amount of 0.02 to 5% by weight, wherein the bismaleimido crosslinker is a compound of formula (I):

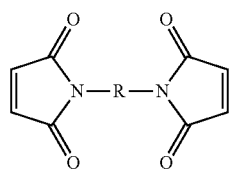

(I)

wherein R is a —$C_2$-$C_{24}$ alkyl.

Another aspect of the invention provides a method of producing a cross-linked polyolefin pipe comprising:

preparing a mixture comprising;

extruding the mixture to form an extruded pipe; and cross-linking a polyolefin structural polymer by heating the extruded pipe, wherein the mixture is prepared by mixing components comprising the polyolefin structural polymer and a bismaleimido crosslinker in an amount of 0.02 to 5% by weight, wherein the bismaleimido crosslinker is a compound of formula (I):

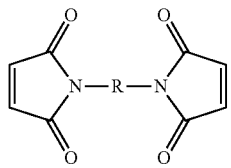

(I)

wherein R is a —$C_2$-$C_{24}$ alkyl.

A third aspect of the invention provides for the use of a bismaleimido crosslinker of formula (I) as defined herein for the production of a polyolefin pipe.

A fourth aspect provides for the use of a pipe of the invention, or a pipe formed in accordance with a method or use of the invention, for the transport of water. In an embodiment the water is drinking water.

DETAILED DESCRIPTION

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

For the avoidance of doubt, it is hereby stated that the information disclosed earlier in this specification under the heading "Background" is relevant to the invention and is to be read as part of the disclosure of the invention.

Polymeric pipes of this invention may be used for variety of applications, for example transport of hot and/or cold potable water, radiant floor heating, or waste water, as well as being used in fire sprinklers, process pipes in industries such as the food industry, and for conveying fluids other than water such as gases and slurries, among other uses. In some embodiments, these polymeric pipes include a base pipe with one or more layers disposed on the base pipe. Examples of various layers that may be disposed on a polymeric base pipe are included in US 2010/0084037, entitled "Methods and Compositions for Coating Pipe," which is incorporated by reference in its entirety. In other embodiments, the polymeric pipe includes the base pipe with no layers disposed on the base pipe, i.e. the pipe will consist of a single (i.e. one) layer.

Pipe Standards and Certifications

Pipe standards and standard test procedures referenced in the present disclosure include the following:

ASTM International Standard for Crosslinked Polyethylene (PEX) Tubing, F 876-10 (approved Feb. 1, 2010) ("ASTM F876");

EN ISO 15875, Plastics piping systems for hot and cold water installations—Crosslinked polyethylene (PE-X);

Guideline for Hygienic Assessment of Organic Materials in Contact with Drinking Water (KTW Guideline) of Umweltbundesamt (UBA), English version issued 7 Oct. 2008 ("KTW Guideline");

EN 1484 Water analysis: Guidelines for the determination of total organic carbon (TOC) and dissolved organic carbon (DOC) issued May 1997 ("EN 1484");

EN 1622:2006 Water quality: Determination of the threshold odour number (TON) and threshold flavour number (TFN) ("EN 1622").

The contents of all of these standards are incorporated herein by reference.

The tests referred to herein are known standards in the industry and are available to the skilled person. We therefore only refer to them briefly in the interests of brevity. However, the content of these standards forms an integral part of the invention to the extent that the pipes according to the invention may meet or exceed the requirements of the standards. Hence the content of these standards is explicitly incorporated into the present disclosure by reference.

ASTM F876 (North America) and EN ISO 15875 (Europe): Before product launch, certified pipes typically have to pass all required testing in accordance with these two standards, respectively.

The degree of crosslinking can be quantified in accordance with the following citation from ASTM F876:

"6.8. Degree of Crosslinking-When tested in accordance with 7.9, the degree of crosslinking for PEX tubing material shall be within the range from 65 to 89% inclusive. Depending on the process used, the following minimum percentages crosslinking values shall be achieved: 70% by peroxides (PEX-a), 65% by Azo compounds, 65% by electron beam (PEX-c), or 65% by silane compounds (PEX-b)".

According to the EN ISO standard, for electron beam (PEX-c) and Azo compounds the minimum percentages crosslinking value that shall be achieved is 60%.

Ideally, pipes should have a high, i.e. at least 50% (preferably at least 60%), level of cross-linking according to the standard. However, in some applications a lower degree of cross-linking may be acceptable.

The KTW Guideline may be used to conduct a hygienic assessment of organic materials in contact with drinking water. Total organic carbon (TOC) may be determined in accordance with the migration testing protocols set out at 2.1.1 and 2.1.2 of the KTW Guideline. Odour and flavor testing may be conducted in accordance with the protocols set out at 2.2.1 and 2.2.2 of the KTW Guideline.

Definitions

The following explanations of terms and methods are provided to better describe the present disclosure and to guide those of ordinary skill in the art in the practice of the present disclosure.

The terms "alkyl", "$C_1$-$C_{10}$ alkyl" and "$C_x$-$C_y$ alkyl" (where x is at least 1 and less than 10, and y is a number greater than 10) as used herein include reference to a straight or branched chain alkyl moiety having, e.g. 1, 2, 3, 4, 5, 6, 7, 8, 9 or 10 carbon atoms. The term includes reference to, for example, methyl, ethyl, propyl (n-propyl or isopropyl), butyl (n-butyl, sec-butyl or tert-butyl), pentyl, hexyl and the like. In particular, alkyl may be a "$C_1$-$C_6$ alkyl", i.e. an alkyl having 1, 2, 3, 4, 5 or 6 carbon atoms; or a "$C_1$-$C_4$ alkyl", i.e. an alkyl having 1, 2, 3 or 4 carbon atoms. The term "lower alkyl" includes reference to alkyl groups having 1, 2, 3 or 4 carbon atoms.

The terms "alkenyl", "$C_2$-$C_{10}$ alkenyl" and "$C_x$-$C_y$ alkenyl" (where x is at least 2 and less than 10, and y is a number greater than 10) as used herein include reference to a straight or branched chain alkyl moiety having, e.g. 2, 3, 4, 5, 6, 7, 8, 9 or 10 carbon atoms and having, in addition, at least one double bond, of either E or Z stereochemistry where applicable. This term includes reference to, for example, ethenyl, 2-propenyl, 1-butenyl, 2-butenyl, 3-butenyl, 1-pentenyl, 2-pentenyl, 3-pentenyl, 1-hexenyl, 2-hexenyl and 3-hexenyl and the like. In particular, alkenyl may be a "$C_2$-$C_6$ alkenyl", i.e. an alkenyl having 2, 3, 4, 5 or 6 carbon atoms; or a "$C_2$-$C_4$ alkenyl", i.e. an alkenyl having 2, 3 or 4 carbon atoms.

The terms "alkynyl", "$C_2$-$C_{10}$ alkynyl" and "$C_x$-$C_y$ alkynyl" (where x is at least 2 and less than 10, and y is a number greater than 10) as used herein include reference to a straight or branched chain alkyl moiety having, e.g. 2, 3, 4, 5, 6, 7, 8, 9 or 10 carbon atoms and having, in addition, at least one triple bond. This term includes reference to, for example, ethynyl, 2-propynyl, 1-butynyl, 2-butynyl, 3-butynyl, 1-pentynyl, 2-pentynyl, 3-pentynyl, 1-hexynyl, 2-hexynyl and 3-hexynyl and the like. In particular, alkynyl may be a "$C_2$-$C_6$ alkynyl", i.e. an alkynyl having 2, 3, 4, 5 or 6 carbon atoms; or a "$C_2$-$C_4$ alkynyl", i.e. an alkynyl having 2, 3 or 4 carbon atoms.

Where a compound, moiety, process or product is described as "optionally" having a feature, the disclosure includes such a compound, moiety, process or product having that feature and also such a compound, moiety, process or product not having that feature. Thus, when a moiety is described as "optionally substituted", the disclosure comprises the unsubstituted moiety and the substituted moiety.

Where two or more moieties are described as being "independently" or "each independently" selected from a list of atoms or groups, this means that the moieties may be the same or different. The identity of each moiety is therefore independent of the identities of the one or more other moieties.

The term "CCL" refers to the crosslink density, typically expressed as a percentage. CCL therefore represents a quantitative measure of the level of crosslinking. Throughout the description and claims of this specification, the phrases "degree of crosslinking", "level of crosslinking" and "crosslink density" or similar mean CCL.

The term "TOC" refers to total organic carbon.

Pipes

Unless indicated otherwise in this specification, any reference to a specific component (e.g. polyolefin structural polymer, photoinitiator, reactive extrusion species, co-agent, hindered amine light stabiliser, antioxidant, or any optional additive) in an amount of % by weight is a reference to the component as a % of its weight relative to the total weight of the layer of the pipe in which it is present.

Polymeric pipes of the invention comprise a polyolefin structural polymer. Although the structural polymer may be polyethylene (PE), those of ordinary skill in the art understand that various other structural polymers may be used in place of polyethylene. For example, the structural polymer may be a polyolefin such as PE (e.g., PE-raised temperature, or PE-RT), polypropylene (PP), polybutylenes (PB); any copolymers thereof; polyolefin copolymers such as poly (ethylene-co-maleic anhydride); among other polymers. For example, the structural polymer may be polyethylene, polypropylene, polybutylene, and higher olefinic polymers; copolymers of ethylene, propylene, 1-butene, 2-butene, 1-pentene, 1-hexene, 1-heptene and 1-octene and isomers thereof with each other and with other unsaturated monomers. Block copolymers and polymer blends of polymerised monomers of any of the abovementioned polymers are also included. The polymeric pipe may have at least 85% by weight polyolefin structural polymer, at least 90% by weight polyolefin structural polymer, or at least 95% by weight polyolefin structural polymer.

Preferred polyolefin structural polymers for use in the present invention include polyethylene, polypropylene, and mixtures thereof.

Polyethylene (PE) is classified into several different categories based mostly on its density and branching. The final product performance and mechanical properties depend significantly on variables such as the extent and type of branching, the crystallinity, the density, and the molecular weight and its distribution. As mentioned, PEX pipes are by far and most commonly manufactured from high density polyethylene (HDPE), however, this invention is applicable where any type of polyolefin or polyethylene is used for the production of single-layer or multi-layer plastic pipes such as, but not limited to, low density polyethylene (LDPE), medium density polyethylene (MDPE), PE 100, PE 80, PE-RT grades, very high molecular weight (VHMWPE), and ultra-high molecular weight polyethylene (UHMWPE) or combinations thereof. Examples of commercially available PE that may be used in pipes of the present invention include Basell Q 456, Basell Q 456B, Basell New Resin, Basell Q 471, (all three of which are available from Equistar Chemicals, LP Lyondell Basell Company, Clinton Iowa, U.S.) Borealis HE 1878, Borealis HE 1878 E, Borealis HE 2550 (all three of which are available from Borealis AG).

The polymeric pipes of the invention may comprise cross-linked polyethylene (PEX) as the polyolefin structural polymer, in which case the pipe may be a PEX pipe. The structural polymer in such a pipe may comprise or consist of any of the varieties of polyethylene mentioned herein which has been crosslinked, preferably by the action of a bismaleimido crosslinker as described herein. The pipes of the invention also include pipes where the crosslinker consists of at least one (such as 1, 2, 3 or 4, e.g. 1 or 2) bismaleimido crosslinker as described herein.

Polymeric pipes of the invention may comprise a bismaleimido crosslinker of formula (I):

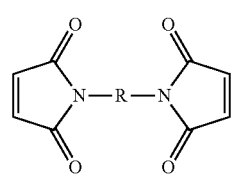

(I)

wherein R is a —$C_2$-$C_{24}$ alkyl. R may also be as further defined herein. For example, R may be a —$C_4$-$C_{18}$ alkyl, e.g. a —$C_4$-$C_{10}$ alkyl. R may be a —$C_2$, —$C_3$, —$C_4$, —$C_5$, —$C_6$, —$C_7$, —$C_8$, —$C_9$, —$C_{10}$, —$C_{11}$, —$C_{12}$, —$C_{13}$, —$C_{14}$, —$C_{15}$, —$C_{16}$, —$C_{17}$, or —$C_{18}$ alkyl, e.g. R may be a —$C_6$ alkyl. For example polymeric pipes of the invention may comprise one or more bismaleimido crosslinker of formula (I), e.g. at least 1, at least 2, at least 3, at least 4 or at least 5 bismaleimido crosslinkers as defined herein. The bismaleimido crosslinker may be present in an amount of 0.02 to 5% by weight, for example 0.2 to 4% by weight, e.g. the bismaleimido crosslinker may be present in an amount of 0.2 to 3% by weight, 0.2 to 2% by weight or 0.5 to 2.5% by weight. For example, the bismaleimido crosslinker may be present in an amount of 0.5 to 5% by weight or in an amount of 1 to 4% by weight, e.g. in an amount of 1 to 3% by weight or 1.5 to 2.5% by weight. For example, the bismaleimido crosslinker may be present in an amount of 0.3 to 2.5% by weight, 0.5 to 2.5% by weight, or 1 to 2% by weight; e.g. about 1% by weight, about 1.2% by weight, about 1.5% by weight, about 1.7% by weight or about 2% by weight.

Without wishing to be bound by any theory, it is believed that a bismaleimido crosslinker of formula (I) is a heat activated crosslinking agent, which after activation may be covalently incorporated into the crosslinked polymer. This may provide advantages compared to other types of crosslinker used in polyolefin pipes. For example, pipes made by a PEX-a process may require a further post-processing treatment to satisfy taste and odour requirements for potable water pipes, due to the presence of byproducts of the peroxide initiators typically used in a PEX-a process. Pipes of the present invention typically avoid (or at least reduce) this further post-processing treatment, due to the absence (or reduced levels) of peroxide initiator.

Polymeric pipes of the invention may comprise a peroxide initiator, for example one or more peroxide initiators; e.g. at least 1, at least 2, at least 3, at least 4 or at least 5 peroxide initiators as defined herein. The peroxide initiator may be present in an amount of 0 to 2% by weight, for example 0.02 to 2% by weight, e.g. the peroxide initiator may be present in an amount of 0.05 to 1.5% by weight or 0.1 to 1.5% by weight. For example, the peroxide initiator may be present in an amount of 0.05 to 1% by weight, 0.1 to 1% by weight, or 0.2 to 1% by weight. The peroxide initiator may be present in an amount of 0.05 to 0.75% by weight, 0.1 to 0.5% by weight, or 0.2 to 0.5% by weight. In an embodiment, the polymeric pipe may not comprise a peroxide initiator, i.e. the peroxide initiator may be present in an amount of about 0% by weight.

Suitable peroxide initiators include organic peroxides, for example organic peroxides that are compatible with polyolefin monomers. Examples of such organic peroxides include alkyl peroxides, alkenyl peroxides, alkynyl peroxides. Exemplary organic peroxides that may be used in the polymeric pipes of the invention include di-tert-butyl peroxide (Trigonox B), 2,5-Dimethyl-2,5-di(tert-butylperoxy) hexyne-3 (Trigonox 145), 3,3,5,7,7-Pentamethyl-1,2,4-trioxepane (Trigonox 311), 2,5-Dimethyl-2,5-di(tert-butylperoxy)hexane (Trigonox 101) and 3,6,9-Triethyl-3,6, 9,-trimethyl-1,4,7-triperoxonane (Triganox 301).

Polymeric pipes of the invention may comprise a co-agent, for example one or more co-agents; e.g. at least 1, at least 2, at least 3, at least 4 or at least 5 co-agents as defined herein. The selected co-agents (monomers and/or oligomers) used in the formulations in the present invention comprise at least one polymerizable double bond or reactive group. The co-agent provides additional crosslinks between the polyolefin chains of the polyolefin structural polymer. The co-agent thus acts to promote and enhance the efficiency of the crosslinking process, e.g. where the polyolefin structural polymer is polyethylene the co-agent enhances the cross-linking of the polyethylene chains to produce PEX. The co-agent (or total amount of co-agents) may be present in an amount of 0.02 to 10% by weight. For example, the co-agent may be present in an amount of 0.1 to 5% by weight, 0.2 to 1% by weight, 0.3 to 0.7% by weight, e.g. about 0.5% by weight.

The co-agent may be selected from co-agents comprising reactive groups such as acrylates, allyl ethers, polybuta-dienes, vinyl ethers, and also unsaturated vegetable oils, such as soybean oil. For example, the co-agent may be selected from acrylates, allyl ethers, polybutadienes and vinyl ethers. The co-agent may comprise a reactive carbon-carbon double bond. A reactive carbon-carbon double bond may be a carbon-carbon double bond that is a terminal carbon-carbon bond. A reactive carbon-carbon double bond may be a carbon-carbon double bond where one of the carbon atoms comprises two geminal hydrogen atoms.

The co-agent may comprise multiple double bonds. This may enhance the level of crosslinking. Polymeric co-agents such as polybutadienes, or any polymer backbone containing unsaturated moieties may be used within the framework of the present invention.

For example, a wide variety of acrylates can be used as co-agents, and include: 1,6-hexanediol diacrylate, 1,3-byty-lene glycol diacrylate, diethylene glycol diacrylate, trimeth-ylolpropane triacrylate, neopentyl glycol diacrylate, poly-ethylene glycol 200 diacrylate, tetraethylene glycol diacrylate, triethylene diacrylate, pentaerythritol tetraacry-late, tripropylene glycol diacrylate, ethoxylated bisphenol-A diacrylate, propylene glycol (mono) dimethacrylate, trim-ethylolpropane diacrylate, di-trimethylolpropane tetraacry-late, triacrylate of tris(hydroxyethyl) isocyanurate, dipen-taerythritol hydroxypentaacrylate, pentaerythritol triacrylate, ethoxylated trimethylolpropane triacrylate, tri-ethylene glycol dimethacrylate, ethylene glycol dimethacry-late, tetraethylene glycol dimethacrylate, polyethylene gly-col-200 dimethacrylate, 1,6-hexanediol dimethacrylate, neopentyl glycol dimethacrylate, polyethylene glycol-600 dimethacrylate, 1,3-butylene glycol dimethacrylate, ethoxy-lated bisphenol-A dimethacrylate, trimethylolpropane trimethacrylate, 1,4-butanediol diacrylate, diethylene glycol dimethacrylate, pentaerythritol tetramethacrylate, glycerin dimethacrylate, trimethylolpropane dimethacrylate, pen-taerythritol trimethacrylate, pentaerythritol dimethacrylate, pentaerythritol diacrylate, aminoplast(meth)acrylates, acry-lated oils such as linseed, soy bean oil, castor oil, etc. Other applicable polymerizable compounds include methacrylam-ides, maleimides, vinyl acetate, vinyl caprolactam, thiols and polythiols. Styrene derivatives are also readily appli-cable within the framework of this invention.

The co-agent may be an oligomer or a pre-polymer. For example, the co-agent may be an oligomer or a pre-polymer having acrylate functionality, e.g. selected from polyure-thane acrylates, epoxy acrylates, silicone acrylates, and polyester acrylates. Other exemplary co-agents include (meth)acrylated epoxies, (meth)acrylated polyesters, (meth)-acrylated silicones, (meth)acrylated urethanes/poly-urethanes, (meth)acrylated poly-butadiene, (meth)acrylated acrylic oligomers and polymers, and the like, and any combinations thereof. An exemplary co-agent is an oligomer or pre-polymer that is a polyurethane acrylate, for example a Krasol NN prepolymer (available from Cray Valley, Inc., Exton, Pa., USA).

Further examples of co-agents of use in the invention include the following:

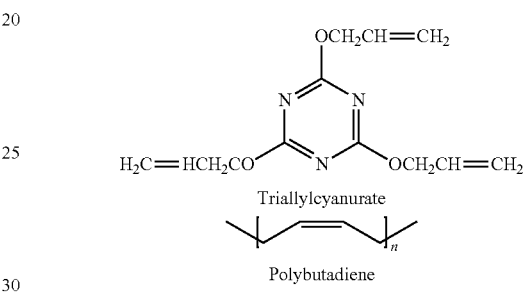

Triallylcyanurate

Polybutadiene wherein n is selected such that the average molecular weight is from about 2,000 to about 10,000 g/mol, preferably from about 4,000 to about 7,000 g/mol, e.g. the average molecular weight may be 3,000 or 5,000 g/mol.

Hydroxy terminated and epoxidized

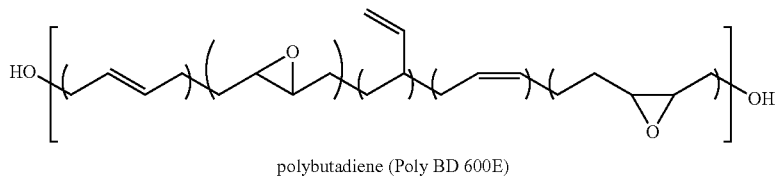

polybutadiene (Poly BD 600E)

having an average molecular weight of about 2,100 g/mol.

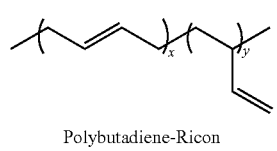

Polybutadiene-Ricon wherein x and y are selected such that the average molecular weight is from about 1,000 to about 10,000 g/mol, prefer-ably from about 2,000 to about 7,000 g/mol. For example, Polybutadiene-Ricon 142 of average molecular weight 4,100 g/mol (CAS #9003-17-2). Polybutadiene-Ricon 152 of average molecular weight 2,900 g/mol (CAS #9003-17-2). Polybutadiene-Ricon 156 of average molecular weight 2,900 g/mol. Polybutadiene-Ricon 157 of average molecular weight 1,800 g/mol.

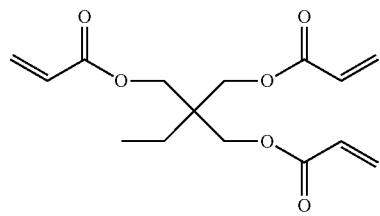

Trimethylolpropane triacrylate (TMPTA)

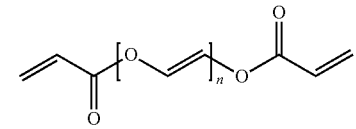

Poly(ehylene glycol) diacrylate (CAS#: 26570-48-9)

where n is selected such that the average molecular weight is about 575 g/mol.

Polybutadiene diacrylate (CAS #: 9003-17-2) of average molecular weight 2,200 g/mol.

Krasol® NN polyurethane prepolymer (available from Cray Valley, Inc., Exton, Pa., USA), for example Krasol® NN 32 (9% NCO, MDI based, 56% vinyl content, viscosity of 12,000 Cps at 25° C. and/or Krasol® NN 35.

Polymeric pipes of the invention may comprise an antioxidant, for example one or more phenolic antioxidants; e.g. at least 1, at least 2, at least 3, at least 4 or at least 5 antioxidants as defined herein. Antioxidants may be used to preserve the polymer blend during the production process, for example when the polymer blend is exposed to the elevated heat and pressure of the extrusion process. Specifically, the mechanical properties of some structural polymers, such as PE, will tend to deteriorate due to oxidative degradation when exposed to heat and pressure. For example, in some cases the deterioration will evidence as the formation of shorter chains, effectively decreasing the average molecular weight of the structural polymer and changing the characteristics of the structural polymer. Antioxidants act to prevent or limit such deterioration.

Antioxidants may also facilitate the maintenance of pipe properties over time, especially when the pipe is exposed to chlorine or other oxidizing agents. In one example, a fluid (e.g. potable water) that is present in the pipe may contain oxidizing agents such as chlorine, which over time may tend to oxidize and break down a structural polymer such as PE. Such oxidation may cause degradation in the properties of the structural polymer and the finished pipe. In some examples, antioxidants tend to preserve the properties of the structural polymer in the presence of an oxidative environment. The total amount of antioxidant (e.g., any one or more of the antioxidants described herein) may be from 0.1 to 2% by weight, from 0.1 to 1.5% by weight, from 0.2 to 1.25% by weight, from 0.2 to 1.0% by weight, from 0.25 to 0.75% by weight, from 0.2 to 0.6% by weight, or about 0.5 wt %.

Suitable antioxidants include phenolic antioxidants. Examples of such antioxidants are described in WO 2010/138816 A1, which is incorporated by reference in its entirety. For example, WO 2010/138816 A1 discloses, at paragraph [0048] on pages 12 to 14, antioxidants that may be used in the pipes of the invention. Exemplary antioxidants that may be used in the polymeric pipes of the invention include:

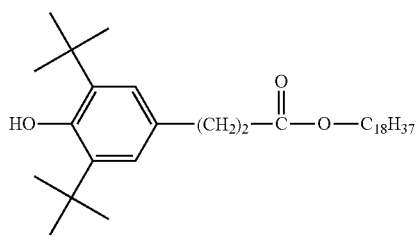

Irganox 1076

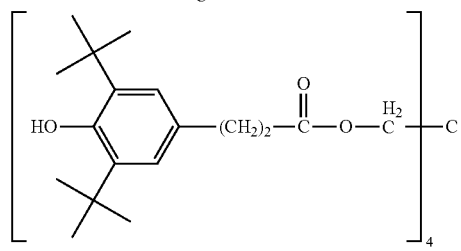

Irganox 1010

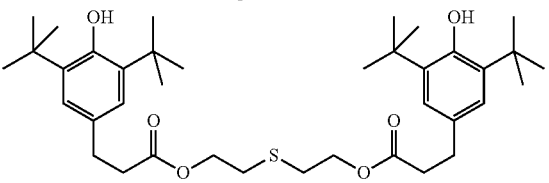

Irganox 1035

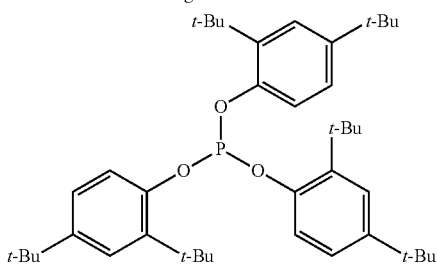

Igrafos 168 (tris(2,4-ditert-butylphenyl)phosphite)

Polymeric pipes of the invention may comprise a hindered amine light stabiliser (HALS), for example one or more HALS; e.g. at least 1, at least 2, at least 3, at least 4 or at least 5 HALS as defined herein. HALS are compounds in which an amine group is sterically hindered by adjacent functional groups. The physical properties of structural polymers such as PE may tend to degrade over time when exposed to ultraviolet (UV) wavelengths of light. The use of HALS in the polymer blend interferes with this degradation and facilitates the maintenance of the structural polymer properties over time. The total amount of HALS (e.g., any one or more of the HALS described herein) may be from 0.05 to 1% by weight, from 0.05 to 0.5% by weight, from 0.07 to 0.3% by weight, from 0.1 to 0.25% by weight, or from 0.1 to 0.2% by weight; or about 0.1% by weight, or about 0.15% by weight.

Exemplary HALS are described in WO 2010/138816 A1, which is incorporated by reference in its entirety. For example, WO 2010/138816 A1 discloses, at paragraph [0050] on pages 15 to 17, HALS that may be used in the pipes of the invention.

Further examples of HALS of use in the present invention are the following:

Cyasorb 3853, which may represented by formula

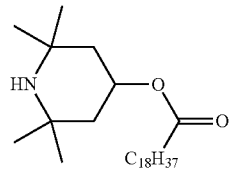

which has a molecular weight of 379 g/mol.

Chimassorb 944LD, which may be represented by formula

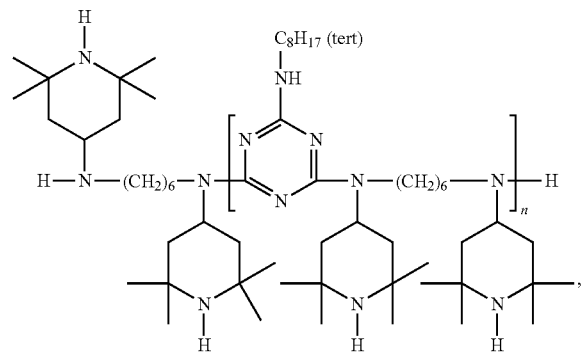

which has a molecular weight of 2000 to 3100 g/mol.

Tinuvin 770, which may be represented by formula

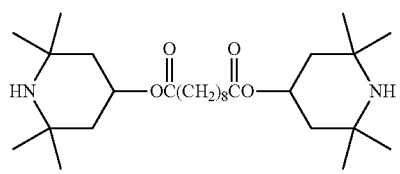

which has a molecular weight of 481 g/mol.

Tinuvin 622, which may be represented by formula

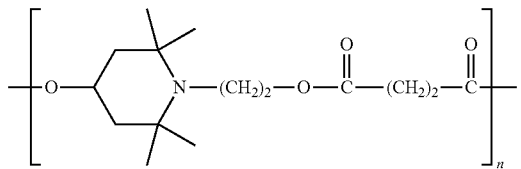

which has a molecular weight of 3100 to 4000 g/mol.

Pipes of the invention may comprise further additives, for example the pipes may comprise one or more processing aids, fillers or pigments. For example, pipes of the present invention may comprise fillers, e.g. nano-particles, nano-fibres, or other organic fillers, inorganic fillers, fibres, or particles. For example the pipes may comprise processing aids, e.g. fluoropolymers. For example, pipes of the present invention may comprise a fluoropolymer that is selected from 3M™ Dynamar™ polymer processing additives, e.g. 3M™ Dynamar™ Polymer Processing Additive FX 9613 (available from 3M Center, St. Paul, Minn.). When the pipe comprises at least one processing aid, the processing aid may be present at a level of from 0.01 to 1% by weight, for example 0.01 to 0.5% by weight; e.g. 0.02 to 0.4% by weight, 0.02 to 0.1% by weight.

Methods

Pipes may be manufactured in accordance with a method or process of the invention. The process of the present invention is based upon a method of PEX-a manufacturing. The components that are used to form the pipe, namely a polyolefin structural polymer and other components such as a bismaleimido crosslinker as defined herein, and/or a peroxide initiator, and/or a co-agent, and/or an antioxidant, and/or a hindered amine light stabiliser and optionally further additives are typically mixed together, for example dry mixed in a blender/mixer, to form a mixture. The mixture is then introduced into an extruder (e.g. a counter-rotating twin screw extruder), extruded and directly after extrusion (e.g. in-line) heated using an infra-red (IR) oven to form a crosslinked pipe.

Compared to a typical PEX-a method used to manufacture drinking water pipes, the methods of the present invention provide a number of advantages. For example, methods of the present invention typically do not require (or at least reduce the need for) an additional post processing treatment step, which for example may be required for PEX-a to satisfy hygiene requirements. This simplifies the manufacturing process, and may also improve compatibility with downstream processes.

It will also be appreciated that pipes of the invention may be manufactured in accordance with methods for the manufacture of polymeric pipes comprising polyolefin that are known in the art, e.g. by applying such methods to form a pipe of the invention from the components as disclosed herein that are used to form the pipe.

Assays

Pipes of the invention can be assessed in relation to a number of parameters using standard tests that would be known to the person skilled in the art. A number of suitable assays are described below and other suitable assays have been described previously under the heading "Pipe Standards and Certifications".

(A) Crosslinking Assay

The degree of crosslinking may be measured in accordance with the testing protocol set out in ASTM F 876 at 7.9. The degree of crosslinking may also be tested in accordance with the testing protocol set out in ISO 15875. When tested in accordance with ASTM F 876 or ISO 15875, a pipe of the invention may have a degree of crosslinking of about 60% to about 90%, e.g. of about 65% to about 89%. For example the degree of crosslinking may be measured to be about 70% to about 80%, e.g. about 70% to about 75%. The degree of crosslinking may be about 73%, e.g. 73±1% or 73±0.5%.

(B) TOC Assay

The TOC may be measured in accordance with the migration testing protocols set out in the KTW Guideline at 2.1.1 and 2.1.2, with the TOC of the migration water samples determined in accordance with EN 1484. When tested in accordance with the KTW Guideline, a pipe of the invention may have a TOC of not more than 2.5 mg/dm²×d, for example of not more than 2 mg/dm²×d, e.g. of not more than 1.5 mg/dm²×d.

(C) Taste and Odour Assay

The taste and odour may be measured in accordance with the odour and flavour testing protocols set out in the KTW Guideline at 2.2.1 and 2.2.2. When tested in accordance with the KTW Guideline, a pipe of the invention may have a taste and odour measurement of not more than 5, e.g. a taste and odour measurement of not more than 4. For example, a pipe of the invention may have a taste and odour measurement of at least 1 and not more than 5, e.g. of at least 2 and not more than 4.

(D) Components Assay

The components present in a polymeric pipe may be assessed by performing an assay that comprises taking a section of the pipe, extracting the section of the pipe with an organic solvent under controlled conditions and analysis of the compounds extracted into the solvent using an analytical technique such as GC/MS.

A suitable protocol for organic extraction is provided by the following method. 1 g of pipe sample is placed in 2 mL of xylene and allowed to condition at 70° C. for 24 hours. After that, the remaining solid pipe sample is removed (for example by filtration) providing an extract comprising xylene and components extracted from the pipe sample. If a different amount of pipe sample is used, the amount of xylene may be varied in proportion to the amount of pipe sample.

The extract may then be analysed by GC/MS to determination the components extracted from the pipe using standard methods. A suitable standard method of GC/MS analysis is set out in NSF International Standard/American National Standard for Drinking Water Additives 61-2011 (Jun. 10, 2011) ("NSF 61") at B.7.4.2 "Gas chromatography/mass spectroscopy (GC/MS) analysis" and further specified under subheadings B.7.4.2.1-B.7.4.2.4 on pages B14 to B16, the content of which is incorporated herein by reference.

Example 1

Formulation

A pipe was made from polyethylene Borealis 1878E, with the formulation comprising hexamethylene-1,6-dimaleimide (CAS 4856-87-5) in an amount of 1.75% weight.

Processing

The formulation was carefully dry mixed in a blender/mixer prior being inserted into the extruder. The pipe was processed using a Weber DS7 twin screw extruder. The heating up of the pipe, for activating the crosslinking process, was made using an IR oven, located directly after the extruder. The extrusion was run at 75 kg/h, producing a 20*2.8 mm pipe.

Results

A cross-linked pipe was made. The chemical crosslinking level was 60.5%.

TOC at room temperature, when measured in accordance with the KTW Guideline and EN 1484: 1.3 (≤2.5 requirement).

Taste and odour at 60° C., when measured in accordance with the KTW Guideline: 2-4 (requirement ≤4).

This formulation therefore meets TOC at room temperature and taste and odour requirements. In contrast, for a PEX-a or a PEX-b pipe a post extrusion process is typically required before the pipe will meet the TOC and taste and odour requirements.

Example 2

The procedure of Example 1 was repeated, but with the formulation comprising hexamethylene-1,6-dimaleimide (CAS 4856-87-5) in an amount of 2.0% weight. The chemical crosslinking level was the same as the chemical crosslinking level obtained in Example 1 (60.5%).

The invention claimed is:

1. A polymeric pipe formed from an extruded mixture comprising:
a high molecular weight high-density polyethylene; and
a bismaleimido crosslinker in an amount of about 1.35 to about 2% by weight, wherein the bismaleimido crosslinker is hexamethylene-1,6-dimaleimide.

2. The pipe of claim 1, wherein the bismaleimido crosslinker is in an amount of about 2% by weight.

3. The pipe of claim 1, further comprising a peroxide initiator in an amount of 0.02 to 2% by weight.

4. The pipe of claim 3, wherein the peroxide initiator is at least one organic peroxide.

5. The pipe of claim 3, wherein the organic peroxide comprises di-tert-butyl peroxide (Trigonox B), 2,5-Dimethyl-2,5-di(tert-butylperoxy)hexyne-3 (Trigonox 145), 3,3,5,7,7-Pentamethyl-1,2,4-trioxepane (Trigonox 311), 2,5-Dimethyl-2,5-di(tert-butylperoxy)hexane (Trigonox 101) and 3,6,9-Triethyl-3,6,9,-trimethyl-1,4,7-triperoxonane (Trigonox 301).

6. The pipe of claim 1, wherein the pipe further comprises a co-agent in an amount of 0.02-10% by weight, wherein the co-agent comprises at least one reactive carbon-carbon double bond, or wherein the co-agent comprises at least two reactive carbon-carbon double bonds.

7. The pipe of claim 6, wherein the co-agent comprises acrylate, methacrylate, polybutadiene, allyl ethers, vinyl ethers and mono or polyunsaturated oils.

8. The pipe of claim 1, further comprising an antioxidant in an amount of 0.1 to 2% by weight.

9. The pipe of claim 8, wherein the antioxidant comprises

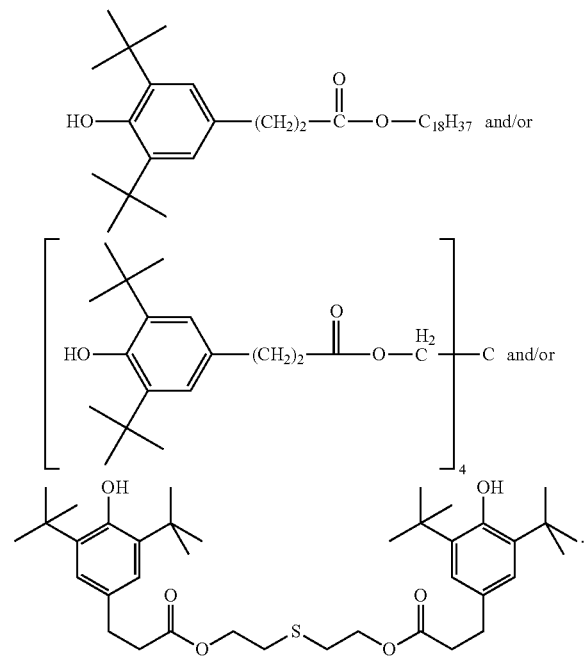

10. The pipe of claim 1, further comprising a hindered amine light stabiliser (HALS) in an amount of 0.05 to 1% by weight.

11. The pipe of claim 10, wherein the hindered amine light stabiliser comprises:

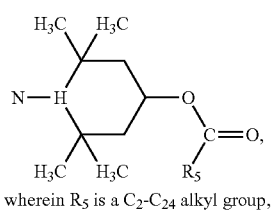

wherein R$_5$ is a C$_2$-C$_{24}$ alkyl group,

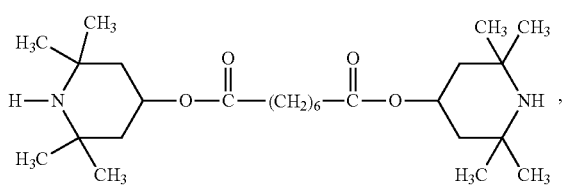

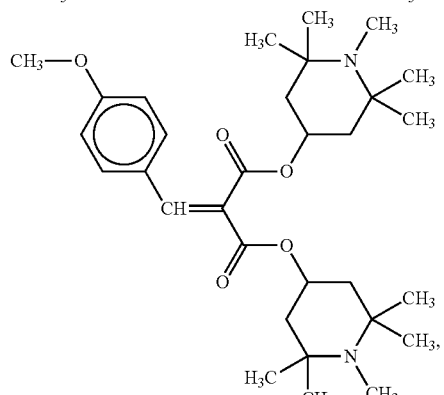

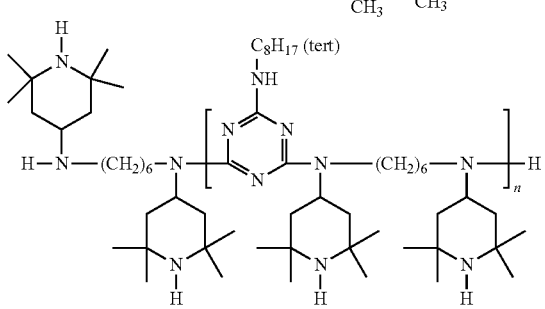

which has a molecular weight of 2000 to 3100 g/mol, or

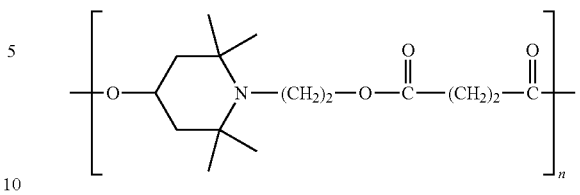

which has a molecular weight of 3100 to 4000 g/mol.

12. The pipe of claim 1, wherein the pipe has a degree of crosslinking in the range of about 60 to about 90%.

13. A method of producing a cross-linked polyethylene pipe comprising:
   preparing a mixture;
   extruding the mixture to form an extruded pipe; and
   cross-linking a high molecular weight high-density polyethylene by heating the extruded pipe,
   wherein the mixture is prepared by mixing components comprising the high molecular weight high-density polyethylene and a bismaleimido crosslinker in an amount of about 1.35 to about 2% by weight, wherein the bismaleimido crosslinker is hexamethylene-1,6-dimaleimide.

14. The method of claim 13, wherein the mixture is prepared by dry mixing the components of the mixture, optionally in a blender/mixer.

15. The method of claim 13, wherein the heating is performed using an infra-red (IR) oven, optionally directly after extrusion.

16. The method of claim 15, wherein the IR oven is in-line with an extruder that performs the extruding, optionally wherein the extruder is a twin-screw extruder.

17. A polymeric pipe formed from an extruded mixture comprising:
   (a) a high molecular weight high-density polyethylene; and
   (b) a bismaleimido crosslinker in an amount of about 1.35 to about 2% by weight, wherein the bismaleimido crosslinker is hexamethylene-1,6-dimaleimide, and wherein the pipe has a degree of crosslinking in the range of about 60 to about 90%.

* * * * *